(12) United States Patent
Kuo

(10) Patent No.: US 8,878,082 B2
(45) Date of Patent: Nov. 4, 2014

(54) TOUCH-CONTROL WRITING TOOL

(71) Applicant: Chih-Ju Kuo, Hualien County (TW)

(72) Inventor: Chih-Ju Kuo, Hualien County (TW)

( * ) Notice: Subject to any disclaimer, the term of this patent is extended or adjusted under 35 U.S.C. 154(b) by 126 days.

(21) Appl. No.: 13/678,706

(22) Filed: Nov. 16, 2012

(65) Prior Publication Data
US 2013/0342511 A1 Dec. 26, 2013

(30) Foreign Application Priority Data
Jun. 26, 2012 (TW) .............................. 101212220 U

(51) Int. Cl.
*G06F 3/033* (2013.01)
*G06F 3/0354* (2013.01)

(52) U.S. Cl.
CPC .................................. *G06F 3/03545* (2013.01)
USPC ........................................ 178/19.01; 345/179

(58) Field of Classification Search
USPC .............................. 345/179; 178/19.01–19.04
See application file for complete search history.

(56) References Cited

U.S. PATENT DOCUMENTS

| 5,488,204 | A  | * | 1/1996  | Mead et al. ................ 178/18.06 |
| 6,450,721 | B1 | * | 9/2002  | D'Amico et al. ............ 401/258 |
| 2013/0038579 | A1 | * | 2/2013  | Boyd et al. ..................... 345/179 |
| 2013/0064597 | A1 | * | 3/2013  | Davies-Smith et al. ....... 401/223 |
| 2013/0322951 | A1 | * | 12/2013 | Hwang ......................... 401/195 |

* cited by examiner

*Primary Examiner* — Rodney Amadiz
(74) *Attorney, Agent, or Firm* — Rosenberg, Klein & Lee

(57) ABSTRACT

A touch-control writing tool wherein the pipe body of the touch-control writing tool has a long through hole and an opening on one end thereof. A rotating element is pivotally provided on the end of the opening of the pipe body. The writing head of a rod body goes through and protrudes from the rotating element. The rotating element drives the rod body to perform an axial displacement in the long through hole via the transmission component in the long through hole, thereby adjusting the length of the writing head outside the rotating element.

11 Claims, 12 Drawing Sheets

– continued –

TOUCH-CONTROL WRITING TOOL

BACKGROUND OF THE INVENTION

1. Field of Invention

The invention relates to a writing tool and, in particular, to a touch-control tool that allows its user to write on a touch-control screen.

2. Related Art

A conventional stylus 9 is shown in FIG. 12. It is mainly a body 90 whose one end is a writing head 91 made of bristles. A user holds the body 90, and writes on the touch-control screen (not shown) with the writing head 91. By writing, we refer to both text writing and figure drawing.

However, the writing head 91 on the end of the body 90 of the stylus 9 has different lengths for different needs. The length of the writing head 91 exposed from the end of the body 90 of the stylus 9 is fixed. If the length of the exposed writing head 91 needs to be different, one has to use another stylus with a write head 91 of different length. Therefore, the user needs to purchase writing heads 91 of different lengths. Since styluses are expensive, this inevitably imposes financial burden as well as inconvenience on the user.

SUMMARY OF THE INVENTION

To solve the above problems, the invention provides a touch-control writing tool. When a user needs to use writing heads of different lengths for writing, he or she can adjust the length of the writing head extending out of the pipe body, without purchasing several writing tools of fixed lengths. This reduces the cost of writing tool and provides more convenience.

To achieve the above-mentioned objective, the invention includes: a pipe body, a rod body, a rotating element, and a transmission component.

The pipe body has an inner hollow to form a long through hole. One end of the pipe body is penetrated by the long through hole and has an opening.

One end of the rod body is provided with a conductive writing head, which has a predetermined length and is flexible. The other end of the rod body is inserted into the long through hole of the pipe body via the opening.

The rotating element is pivotally coupled with the pipe body and exposed from the opening end thereof. The writing head of the rod body goes through the rotating element and extends outside the rotating element.

The transmission component is disposed in the long through hole of the pipe body. With the help of the transmission component, the rotation of the rotating element drives the rod body to perform an axial displacement inside the pipe body. This mechanism adjusts the length of the writing head exposed from the rotating element.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE INVENTION

The present invention will be apparent from the following detailed description, which proceeds with reference to the accompanying drawings, wherein the same references relate to the same elements.

Figure 1:
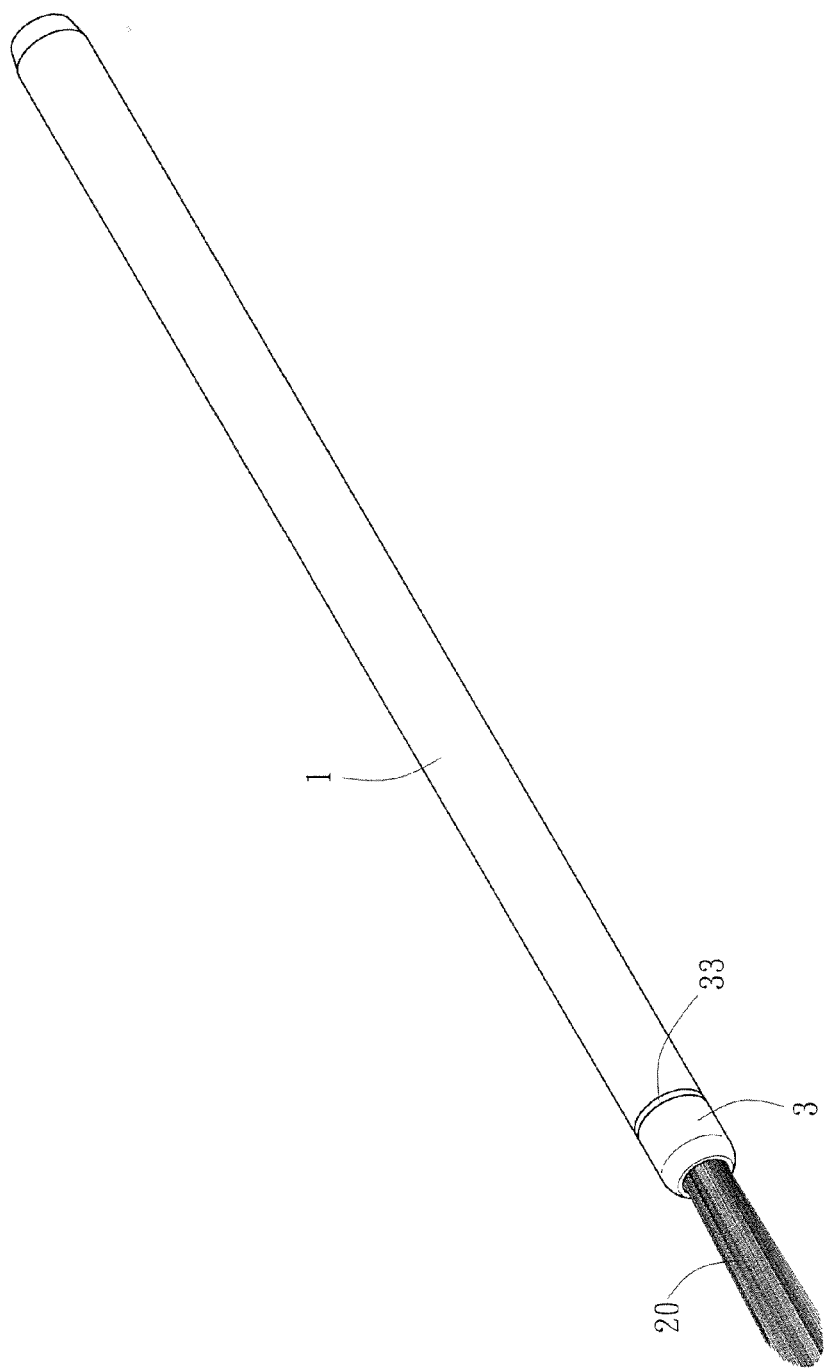
FIG. 1 is a three-dimensional view of the touch-control writing tool in the first embodiment.
Figure 2:
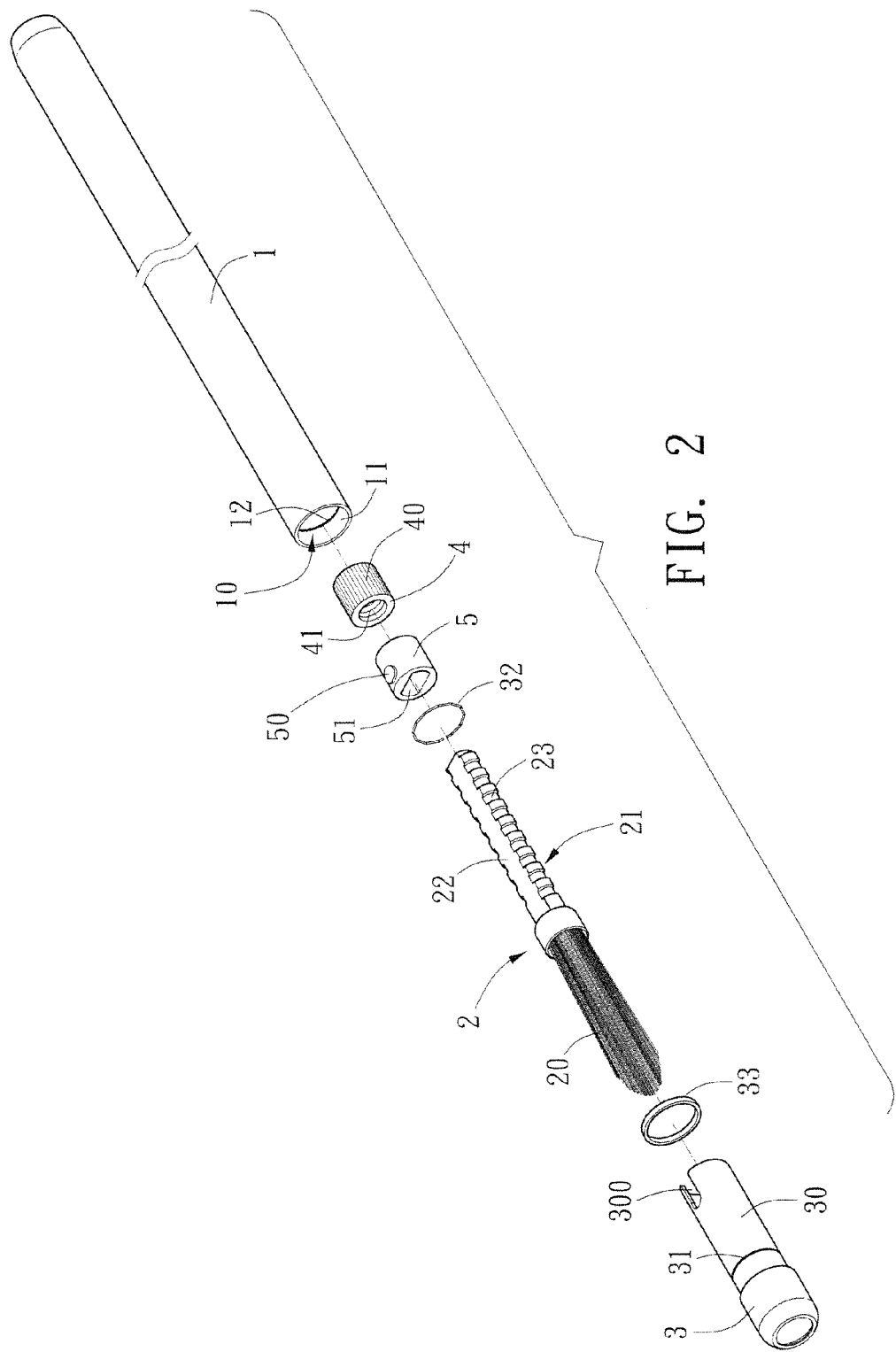
FIG. 2 is an exploded view of the touch-control writing tool in the first embodiment.

An embodiment of the invention provides a touch-control writing tool, a stylus. As shown in FIGS. 1 and 2, the stylus comprises a pipe body 1, a rod body 2, a rotating element 3 and a transmission component.

Figure 3:
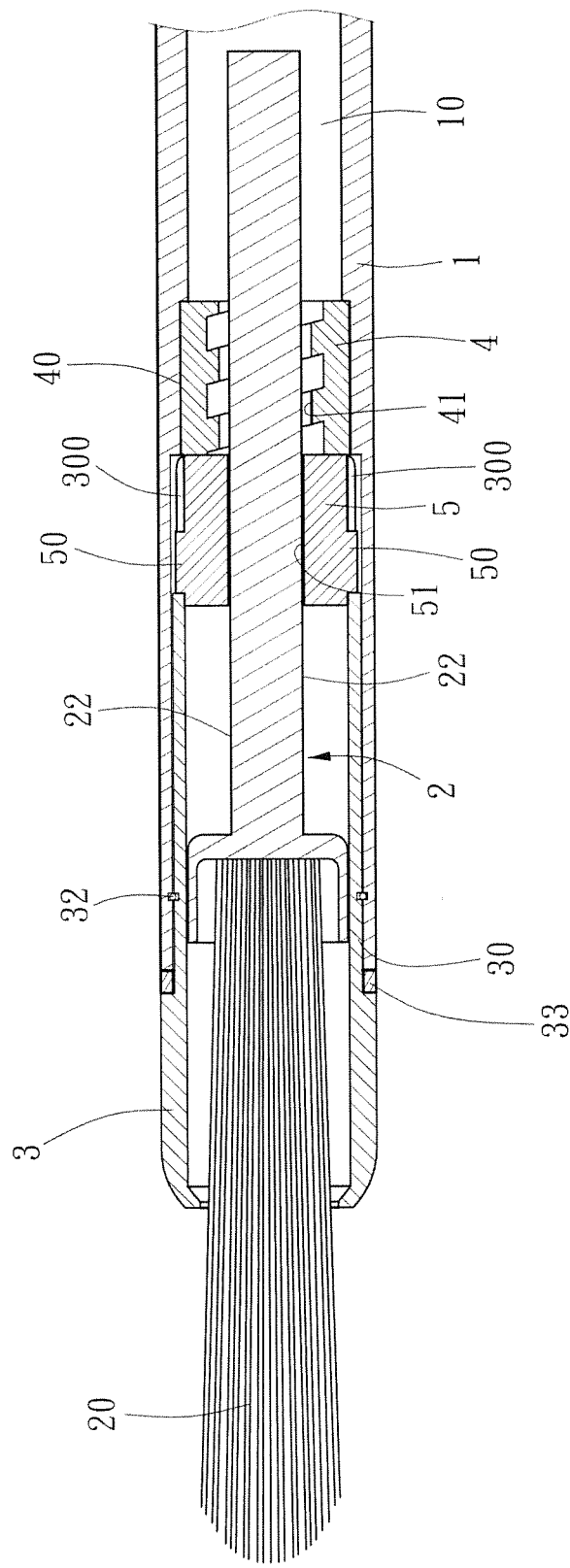
FIG. 3 is a local cross-sectional view of the writing head of the touch-control writing tool in the first embodiment.

As shown in FIGS. 2 and 3, the pipe body 1 in this embodiment is made of a thick copper pipe. The pipe body 1 is hollow inside to form a long through hole 10. One end of the pipe body 1 in this embodiment is penetrated through by this long through hole 10 to form an opening 11. The inner wall of the long through hole 10 of the pipe body 1 is provided around the opening 11 with a first groove 12.

As shown in FIGS. 2 and 3, the rod body 2 is made of copper. One end of the pipe body 2 is provided with a writing head 20, a predetermined length of the head 20 of this writing, and the writing head 20 with a predetermined length. The writing head in this embodiment is comprised of bristles with conductivity. In comparison with usual round-writing heads, the disclosed writing head 20 has more meticulous brushwork. The other end of the writing head 20 is inserted into the long through hole 10 of the pipe body 1 via the opening 11. In this embodiment, the path has a large diameter and the small diameter of the rod of the lever body 2, the rod body 2 has large-diameter parts located on opposite sides and having an outward curved surface 21 and small-diameter parts located on both sides of the outward curved surface 21 and having a flat surface. The outward curved surface 21 with the large diameter is formed with an outer thread 23.

Figure 4:
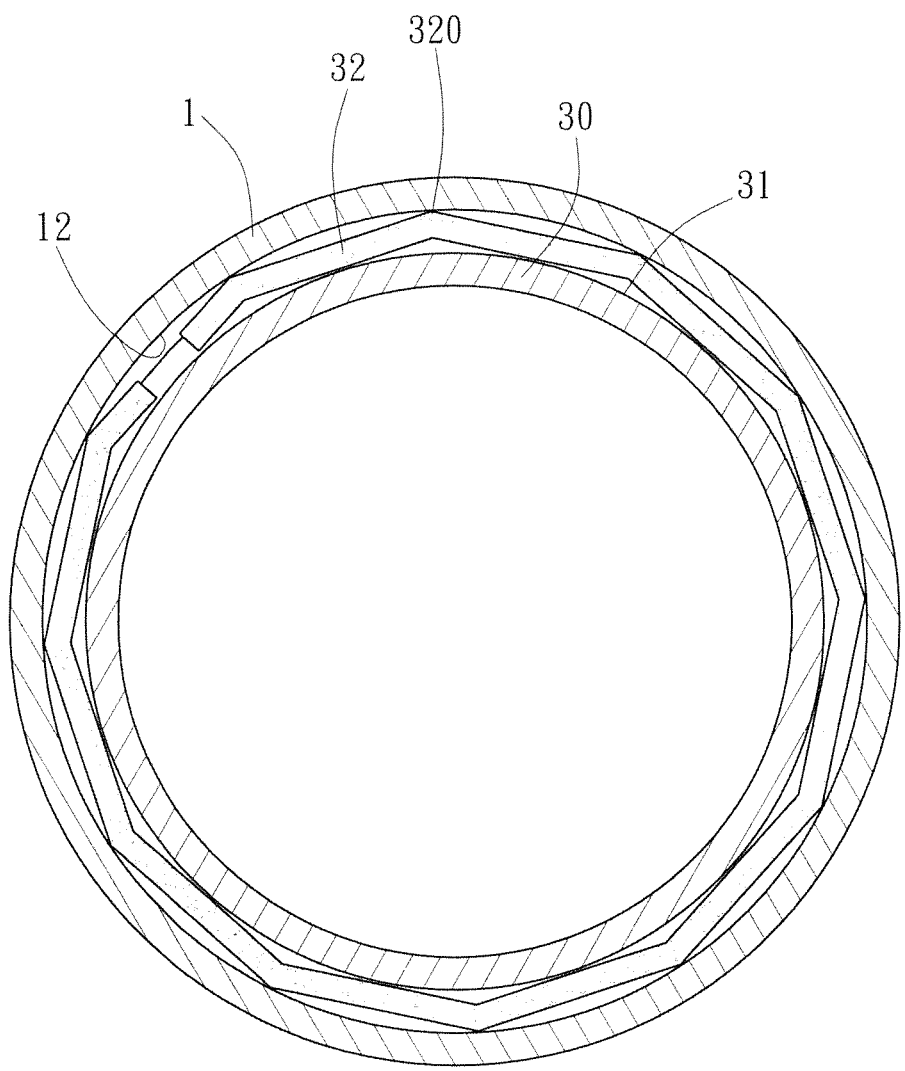
FIG. 4 is a cross-sectional view showing that the touch-control writing tool in the first embodiment positions steel rings in the first groove and the second groove, thereby pivotally accommodating the rotating element in the pipe body.

As shown in FIGS. 2 and 3, the rotating element 3 in this embodiment is a copper pipe. The rotating element 3 has a hollow extension 30. The extension 30 of the rotating element 3 extends into the long through hole 10 of the pipe body 1. The surrounding of the extension 30 of the rotating element 3 is formed with a second groove 31. The second groove 31 matches with the first groove 12. As FIG. 4 shows, a polygonal steel rim 32 is mounted in the second groove 31. Each corner 320 of the steel rim 32 is exposed from the second groove 31 and gets into the first groove 12. Since the rotating element 3 and the pipe body 1 are coaxial in this embodiment, the rotating element 3 can rotate on the end of the opening 11. The rotating element 3 is exposed from the opening 11 of the pipe body 1. The writing head 20 of the rod body 2 goes through the rotating element 3 and exposes itself from the rotating member 3. In this embodiment, a rubber ring 33 is interposed between the end of the opening 11 of the pipe body 1 and the rotating element 3.

As shown in FIGS. 2 and 3, the transmission component includes a ring 4 and a sliding sleeve 5. The ring 4 and the sliding sleeve 5 are both made of copper. The writing head 20, the rod body 2 and the pipe body 1 are all made of copper as well so that the writing head 20 and the pipe body 1 become electrically conductive.

As shown in FIGS. 2 and 3, near the opening 11 of the long through hole 10, the outer surface 40 of the ring 4 has an embossing rough surface in tight contact with the inner wall of the long through hole 10 of the pipe body 1. The sliding sleeve 5 is inserted into the long through hole 10 via the opening 10 and near the ring 4. The end of the extension 30 of the rotating element 3 is mounted around the sliding sleeve 5 and gets connected. The end of the extension 30 mounted around the sliding sleeve 5 has respectively a notch 300 on opposite sides. Each notch 300 is protruded with a protruding part 50 toward the radial direction. The surrounding of the notches 300 on the extension 30 of the rotating element 3 urge against the protruding parts 50 to rotate the sliding sleeve 5. The rotating element 3 thus rotates with the sliding sleeve 5 simultaneously.

As shown in FIGS. 2 and 3, the ring 4 has an inner thread 41, and the sliding sleeve 5 has an inner hole 51. The diameter of the inner hole 51 of the sliding sleeve 5 corresponds to the diameter of the rod body 2. The rod body 2 is inserted through the inner hole 51 of the sliding sleeve 5 and freely rotates to mount into the inner thread 41 of the ring 4. The sliding sleeve 5 thus rotates synchronously with the rod body 2. The rod body 2 is guided by the inner thread 41 of the ring 4 to perform an axial displacement in the sliding sleeve 5.

Figure 5:
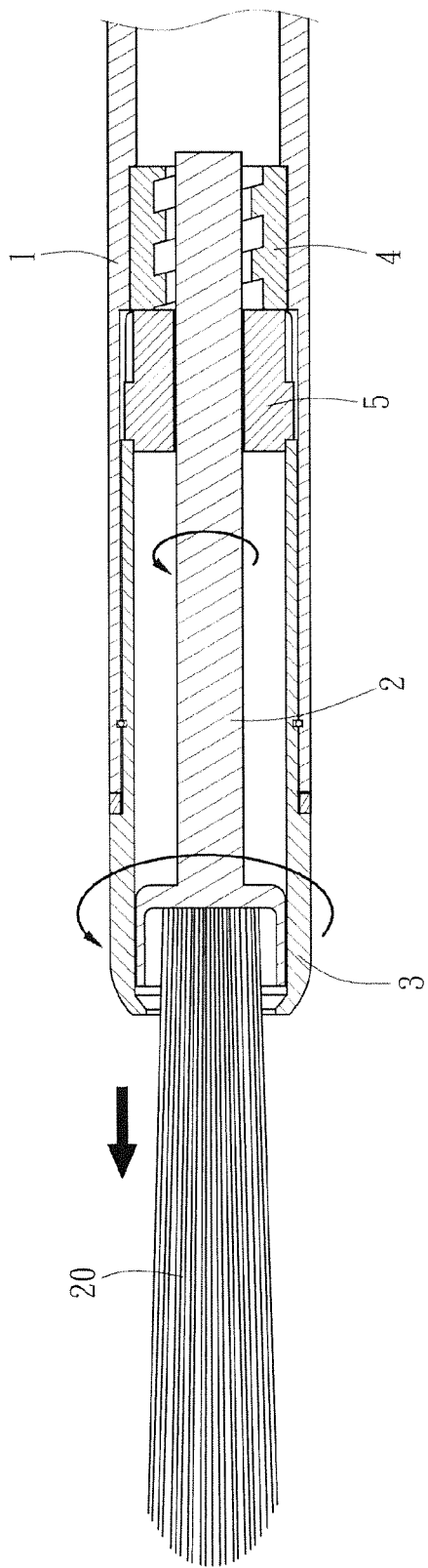
FIG. 5 is a schematic view showing that turning the rotating element renders an axial displacement in the rod body so that the writing head is exposed more from the rotating element.
Figure 6:
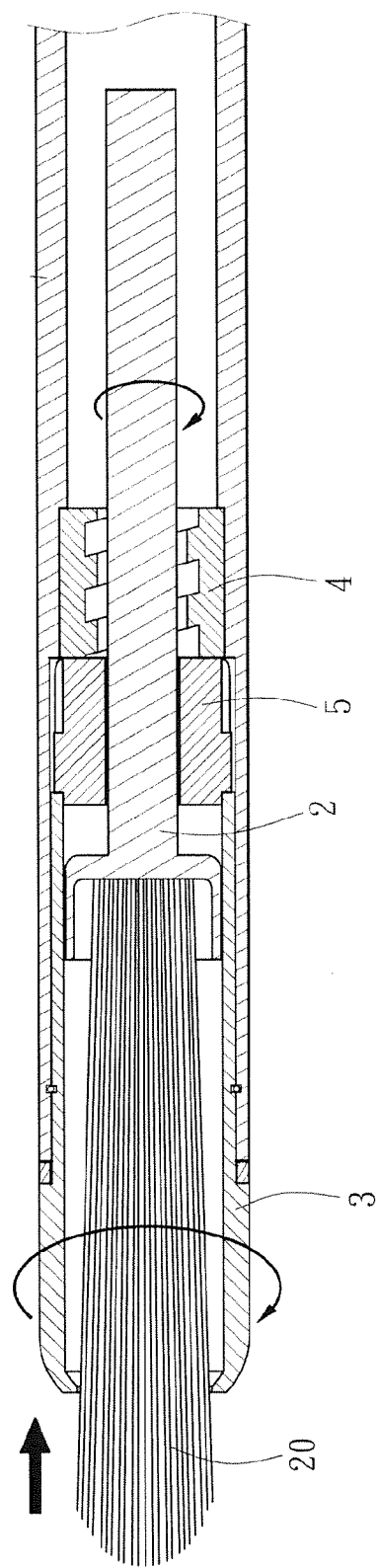
FIG. 6 is a schematic view showing that turning the rotating element renders an axial displacement in the rod body so that the writing head is exposed less from the rotating element.

As shown in FIG. 3, the length of the exposed writing head 20 is roughly half of the overall length of the writing head 20. To further expose the writing head 20, as shown in FIG. 5, one simply rotates the rotating element 3. The end of the extension drives the sliding sleeve 5 to rotate. The sliding sleeve 5 then drives the rod body 2 to rotate simultaneously. The rod body 2 is guided to perform an axial displacement to the left of the drawing. The length of the writing head 20 exposed from the rotating element 3 becomes longer as the rod body 2 makes the displacement. As FIG. 6 shows, to shorten the length of the writing head 20 exposed from the rotating element 3, one simply rotates the rotating element 3 in reverse. The sliding sleeve 5 drives the rod body to rotate simultaneously. The rod body 2 is guided to perform an axial displacement to the right of the FIG. 6. The length of the writing head 20 exposed from the rotating element 3 is shortened as the rod body 2 makes the displacement.

It is easy to see that of the advantage of the invention is the following. The pipe body 1 is linked with the rod body 2 through the transmission components such as the ring 4 and the sliding sleeve 5. The rotation of the rotating element 3 drives the rod body 2 to make an axial displacement inside the pipe body 1. This enables one to adjust the length of the writing head 20 exposed from the rotating element 3 according to needs. Take the stylus in this embodiment as an example. The user only needs to purchase a single stylus and can achieve the writing effects of styluses 20 of different lengths. The user does not need to buy multiple styluses of different lengths. Therefore, the user can save on the cost of styluses.

Figure 7:
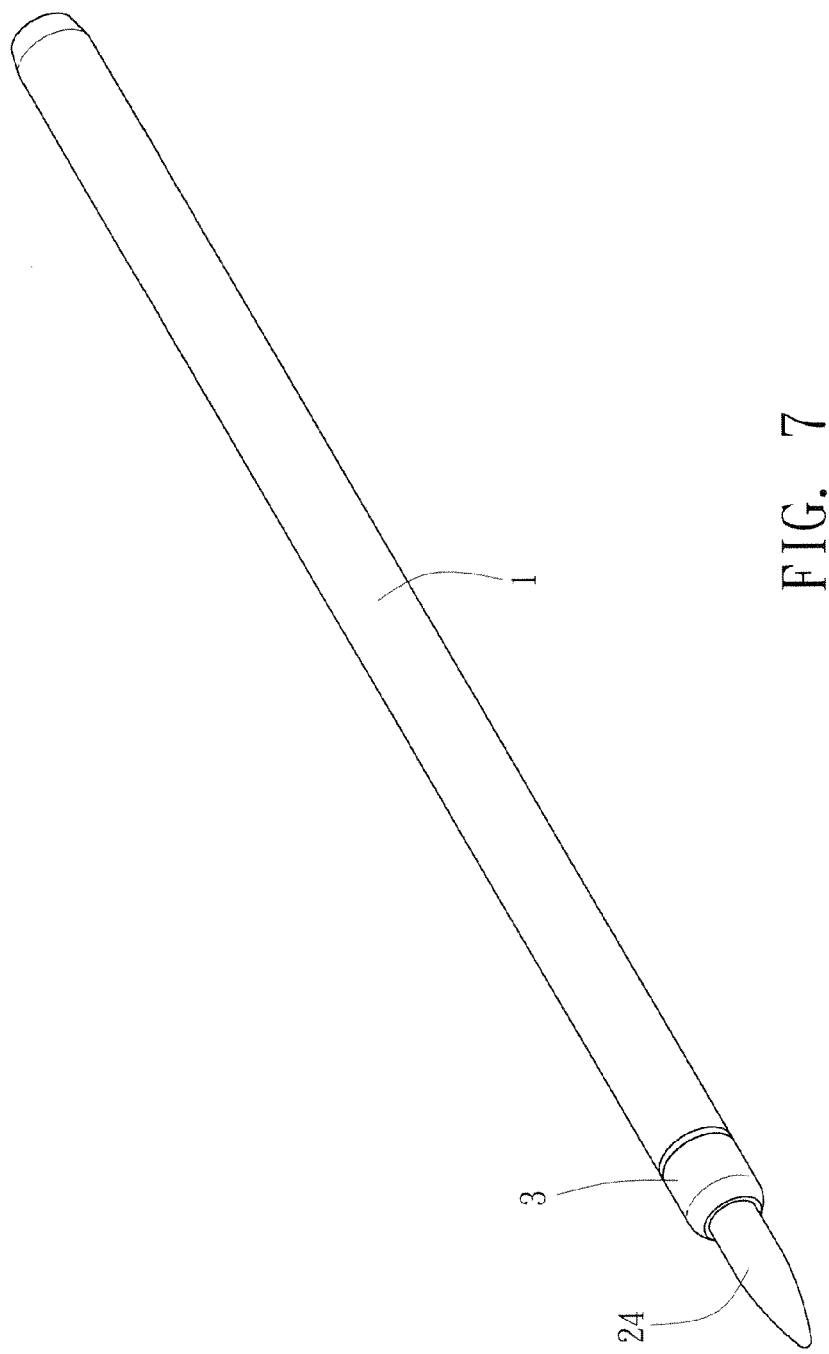
FIG. 7 is a three-dimensional view of the touch-control writing tool in the second embodiment of the invention.

Of course, the invention has many other embodiments that vary in the details. FIG. 7 shows a second embodiment of the invention. The writing head 24 of the rotating element 3 is exposed from one end of the pipe body 1. It is integrally made of a soft material and is flexible. The writing head is also conductive to achieve finer writing and the same effect as the first embodiment.

FIGS. 8 to 11 show the third embodiment of the invention. In this embodiment, the invention includes a pipe body 1A, a rod body 2A, a rotating element 3A and a transmission component.

Figure 8:
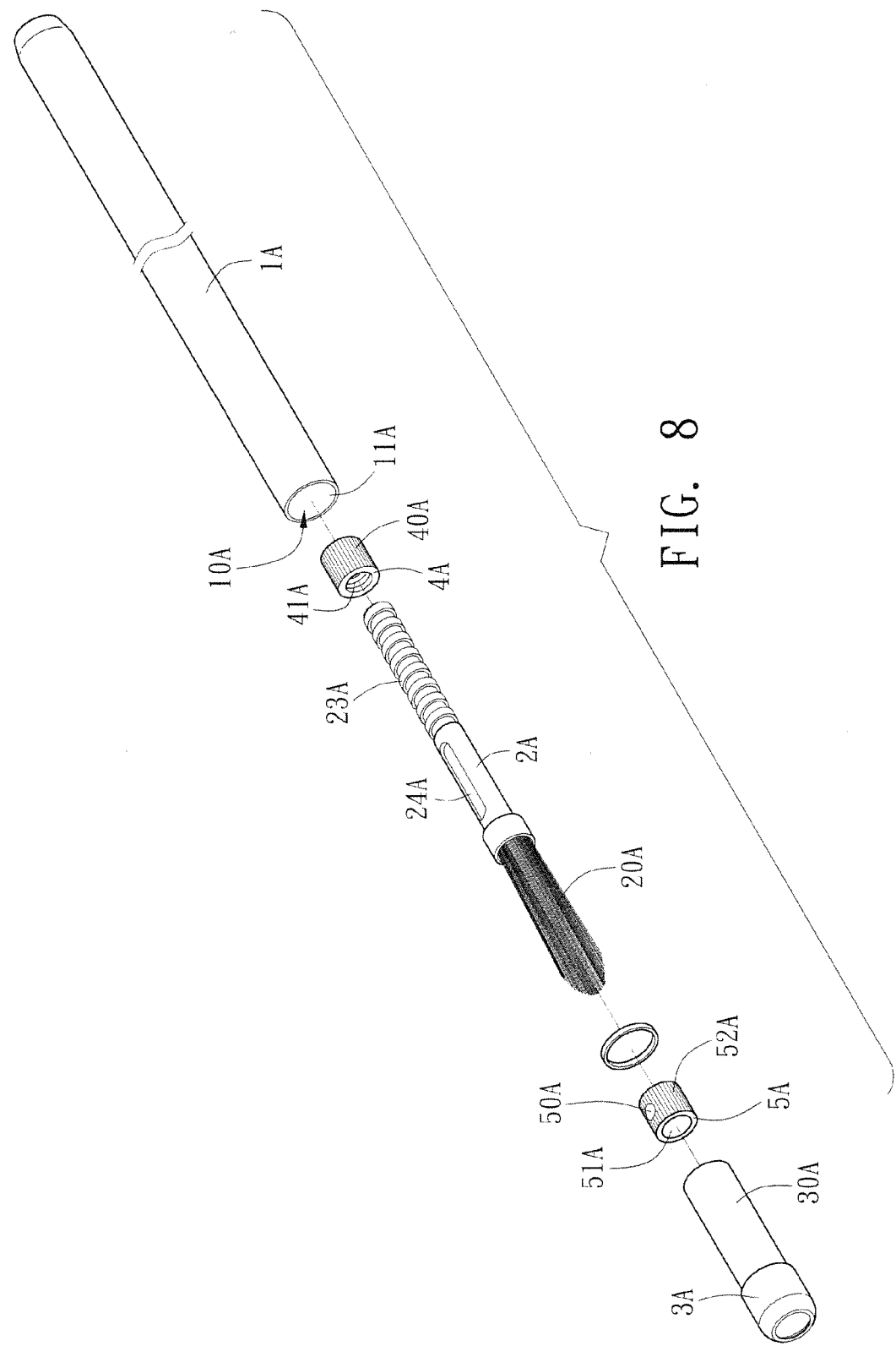
FIG. 8 is a exploded view of the touch-control writing tool in the third embodiment of the invention.
Figure 9:
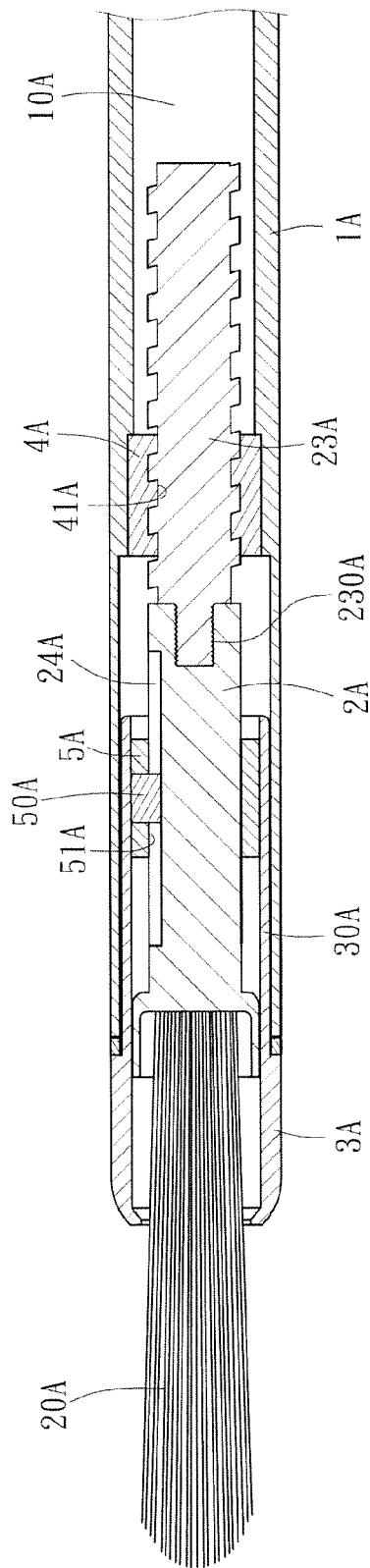
FIG. 9 is a local cross-sectional view on the writing head of the touch-control writing tool in the third embodiment of the invention.

As shown in FIGS. 8 and 9, the transmission component in this embodiment has a ring 4A and a sliding sleeve 5A. The rotating element 3A in this embodiment has an extension 30A that is hollow and inserted into the long through hole 10A of the pipe body 1A. The ring 4A is fixed to the pipe body 1A on the end near the opening 11A inside the long through hole 10A. The outer surface 40A of the ring 4A has a rough structure that is in tight fit to the inner wall of the long through hole 10A of the pipe body 1A. The sliding sleeve 5A is fixed inside the rotating element 3A to the end of the extension 30A in the pipe body 1A. The outer surface 52A of the sliding sleeve 5A is rough and in tight fit with the inner wall of the extension 30A of the rotating element 3A.

As shown in FIGS. 8 and 9, the ring 4A in this embodiment also has an inner thread 41A. The sliding sleeve 5A has a protruding part 50A and an inner hole 51A. The inner hold 51A in this embodiment is round. The protruding part 50A is the sliding sleeve 5A inserted and protruding from the inner hole 51A. The rod body 2A is a round rod and has an outer thread 23A corresponding to the inner hole 51A. The outer thread 23A is formed on a screw bar 230A. The outer thread 23A is formed by assembling the screw bar 230A to the rod body 2A. The rod body 2A goes through the inner hole 51A of the sliding sleeve 5A and is freely rotated to mount onto the inner thread 41A of the ring 4A. A long groove 24A extended along the axial direction of the rod body 2A is formed on the surface of the rod body 2A in accordance with the sliding sleeve 5A. The rotating element 3A and the sliding sleeve rotate simultaneously. The protruding part 50A of the sliding sleeve 5A goes into the long groove 24A and urges against the sidewall thereof, thereby rotating with the rod body 2A. The rod body 2A is guided by the inner thread 41A of the ring 4A to perform an axial displacement within the sliding sleeve 5A.

Figure 10:
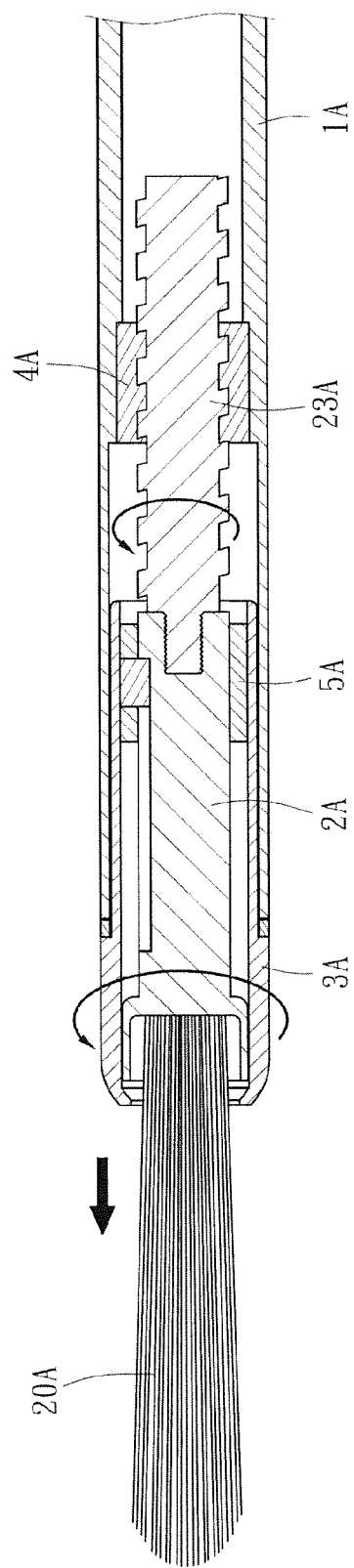
FIG. 10 is a schematic view showing that turning the rotating element renders an axial displacement in the rod body so that the writing head is exposed more from the rotating element according to the third embodiment.
Figure 11:
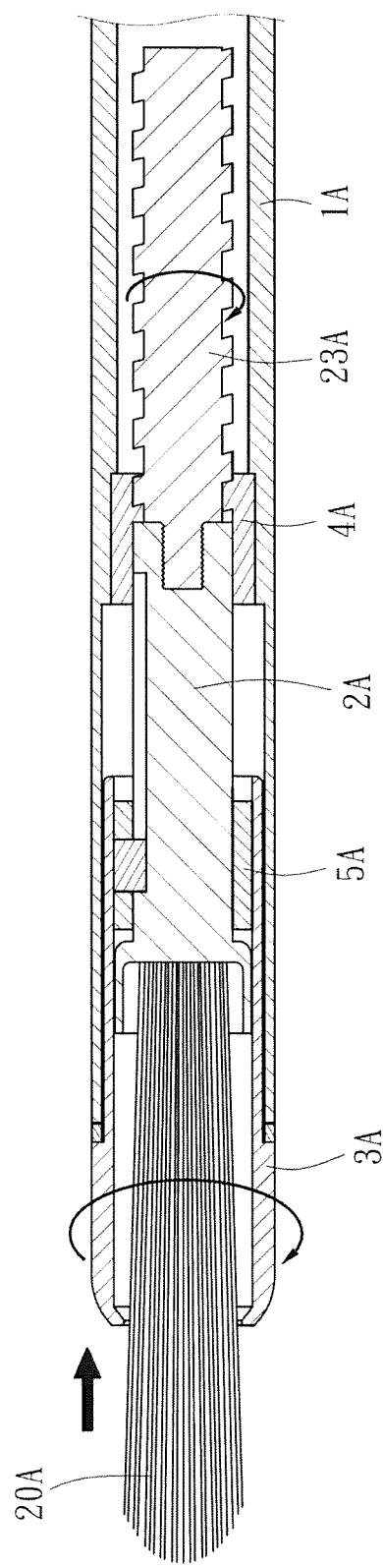
FIG. 11 is a schematic view showing that turning the rotating element renders an axial displacement in the rod body so that the writing head is exposed less from the rotating element according to the third embodiment.
Figure 12:
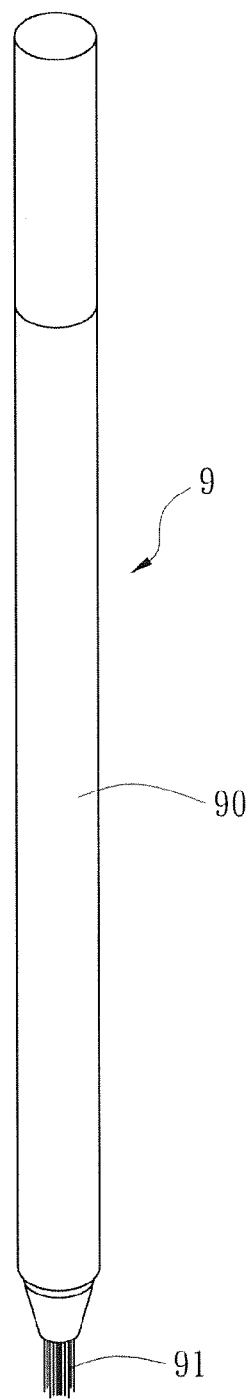
FIG. 12 is a schematic view showing the planar structure of a conventional stylus.

As shown in FIG. 9, the length of the writing head 20A exposed from the rotating element 3A in this embodiment is roughly half the entire length thereof. To further expose the writing head 20, as shown in FIG. 10, one simply rotates the rotating element 3A. With the protruding part 50A of the sliding sleeve 5A at the end of the extension 30A in the long groove 24A, the sliding sleeve 5A drives the rod body 2A to rotate simultaneously. The rod body 2A is guided to make an axial displacement to the left of FIG. 10. In this case, the exposed part of the writing head 20A becomes longer as the rod body 2A makes the displacement. As shown in FIG. 11, to shorten the length of the writing head 20A exposed from the rotating element 3A, one rotates the rotating element 3A in reverse. The sliding sleeve 5A drives the rod body 2A to rotate simultaneously. The rod body 2A is guided to make an axial displacement to the right of FIG. 11. The writing head 20A thus shortens the length of the part exposed from the rotating element 3A. Therefore, this embodiment achieves the same effect as the first embodiment.

Although the invention has been described with reference to specific embodiments, this description is not meant to be construed in a limiting sense. Various modifications of the disclosed embodiments, as well as alternative embodiments, will be apparent to people skilled in the art. Therefore, it is contemplated that the appended claims will cover all modifications that fall within the true scope of the invention.

What is claimed is:

1. A touch-control writing tool, comprising:
a pipe body with a hollow interior forming a long through hole, one end of which is penetrated by the long through hole to form an opening;
a rod body, whose one end is provided with a conductive writing head with a predetermined length and flexibility, the end of the rod body different from the writing head being inserted via the opening into the long through hole of the pipe body;
a rotating element coaxial with and pivotally installed in the pipe body and partly exposed from the opening of the pipe body, the writing head of the rod body extending via the rotating element to expose from the rotating element; and
a transmission component disposed in the long through hole of the pipe body and driven by the rotating element to drive the rod body to make an axial displacement in the long through hole, thereby adjusting the length of the writing head exposed from the rotating element;
wherein the transmission component includes a ring and a sliding sleeve with the ring fixed on the pipe body on the end of the long through hole near the opening and the sliding sleeve being inserted into the long through hole via the opening and tightly next to the ring, the ring has an inner thread, the rod body has a large diameter and a small diameter, the large-diameter part has an outer thread, the sliding sleeve has an inner hole corresponding to the diameter of the rod body, the rod body goes through the inner hole of the sliding sleeve to freely rotate and screw-mount into the inner thread of the ring, the rotating element has an extension that is hollow and extending into the long through hole of the pipe body, the end of the extension links to the sliding sleeve, the rotating element rotates concurrently with the sliding sleeve, the sliding sleeve rotates concurrently with the rod body, and the rod body is guided by the inner thread of the ring to make an axial displacement in the sliding sleeve.

2. The touch-control writing tool of claim 1, wherein the end of the extension is mounted on the surrounding of the sliding sleeve, the mounting end of the extension has a plurality of notches, the sliding sleeve is radially protruded with a plurality of protruding parts at the notches, and the rotating element uses the surroundings of the notches of the extension to urge against the protruding parts, thereby driving the sliding sleeve to rotate.

3. The touch-control writing tool of claim 1, wherein the large-diameter parts of the rod body are on opposite sides and outward curved, the small-diameter parts are on both sides of the outward curved surfaces and flat, and the diameter of the inner hold of the sliding sleeve corresponds to the diameter of the rod body.

4. The touch-control writing tool of claim 1, wherein the outer surface of the ring is a rough surface tightly urging against the inner wall of the long through hole of the pipe body.

5. The touch-control writing tool of claim 1, wherein the inner wall of the long through hole of the pipe body is formed with a first groove near the opening, the surrounding of the extension of the rotating element is formed with a second groove that matches with the first groove, a polygonal steel ring is mounted in the second groove, and each corner of the steel ring exposes from the second groove and goes into the first groove.

6. The touch-control writing tool of claim 1, wherein a rubber ring is interposed between the opening end of the pipe body and the rotating element.

7. The touch-control writing tool of claim 1, wherein the writing head is comprised of a plurality of conductive bristles or integrally formed from a soft material.

8. A touch-control writing tool, comprising:
a pipe body with a hollow interior forming a long through hole, one end of which is penetrated by the long through hole to form an opening;
a rod body, whose one end is provided with a conductive writing head with a predetermined length and flexibility, the end of the rod body different from the writing head being inserted via the opening into the long through hole of the pipe body;
a rotating element coaxial with and pivotally installed in the pipe body and partly exposed from the opening of the pipe body, the writing head of the rod body extending via the rotating element to expose from the rotating element; and
a transmission component disposed in the long through hole of the pipe body and driven by the rotating element to drive the rod body to make an axial displacement in the long through hole, thereby adjusting the length of the writing head exposed from the rotating element;
wherein the transmission component includes a ring and a sliding sleeve, the rotating element has an extension that is hollow and extending into the long through hole of the pipe body, the ring is fixed in the pipe body near end of the opening of the long through hole, the sliding sleeve is fixed inside the rotating element to the end of the extension in the pipe body, the ring body has an inner thread, the sliding sleeve has a round inner hole, the rod body is also round in accordance with the inner hole and has an outer thread, the rod body goes through the inner hole of the sliding sleeve and freely rotates to mount onto the inner thread of the ring, the rod body surface is formed with a long groove extending along the axial direction of the rod body corresponding to the sliding sleeve, the sliding sleeve has a protruding part protruding to the inner hole, the rotating element rotates concurrently with the sliding sleeve, the protruding part of the sliding sleeve goes into the long groove and urges against the sidewall of the long groove, thereby rotating concurrently with the rod body, and the rod body is guided by the inner thread of the ring to make an axial displacement in the sliding sleeve.

9. The touch-control writing tool of claim 8, wherein the outer surface of the ring is a rough surface that tightly urges against the inner wall of the long through hole of the pipe body, and the outer surface of the sliding sleeve is a rough surface that tightly urges against the inner wall of the extension of the rotating element.

10. The touch-control writing tool of claim 8, wherein a rubber ring is interposed between the opening end of the pipe body and the rotating element.

11. The touch-control writing tool of claim 8, wherein the writing head is comprised of a plurality of conductive bristles or integrally formed from a soft material.

* * * * *